June 22, 1926.
J. A. HOMAND
COUPLING
Filed March 8, 1921
1,589,469
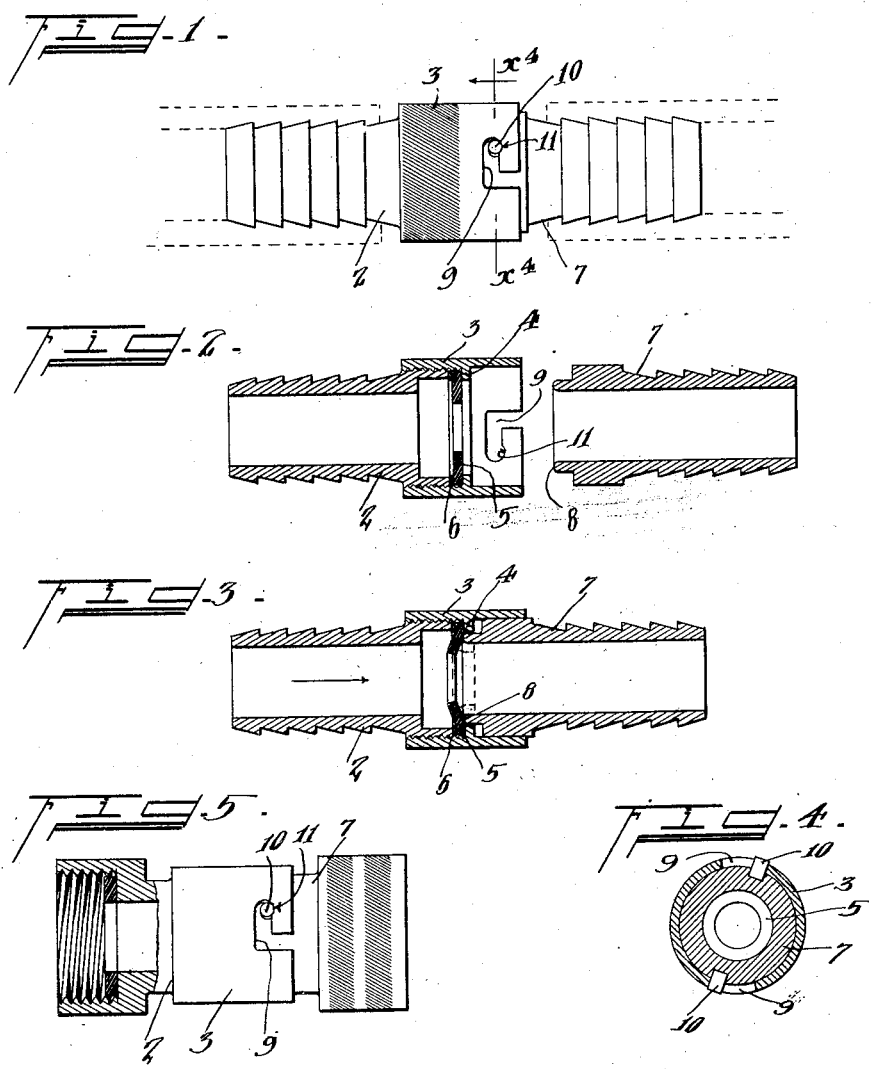
INVENTOR.
James A. Homand.
BY
ATTORNEY.

Patented June 22, 1926.

1,589,469

UNITED STATES PATENT OFFICE.

JAMES A. HOMAND, OF LATIN STATION, CALIFORNIA, ASSIGNOR OF ONE-HALF TO HERBERT V. LEAHY, OF LOS ANGELES, CALIFORNIA.

COUPLING.

Application filed March 8, 1921. Serial No. 450,646.

My invention relates to couplings for pipes and conduits, and is more particularly directed to separable couplings utilized for joining two sections or lengths of pipe or hose together.

The object of the invention is to provide a separable coupling which can be put together and taken apart quickly and which is simple, strong, durable and inexpensive of construction.

Another object is to provide a quick detachable coupling having an absolutely tight joint and in which the velocity of the liquid or gas flowing therethrough functions to increase the efficiency of the device.

Another object is to provide a quick detachable coupling having a yielding joint packing and in which the inherent tension of the packing maintains the coupling members in locked position.

Various other objects and advantages will be more fully apparent from the following description of the accompanying drawings, which form a part of this disclosure, and which illustrate a preferred form of embodiment of the invention.

In the drawings:

Figure 1 is an elevation of the connected coupling device, the coupling members being formed for insertion into lengths of hose.

Fig. 2 is a longitudinal section through the coupling members, said members being in normal uncoupled condition.

Fig. 3 is a similar section showing the coupling members joined.

Fig. 4 is a transverse section on line $x^4$—$x^4$ of Fig. 1.

Fig. 5 is an elevation, partly in section, showing the coupling members formed with threaded ends for joining two pipe sections.

In devices of the character herein disclosed it is desirable that the members be capable of being quickly joined together or taken apart and at the same time it is of great importance that an absolutely tight joint be secured. In the present device the inherent resiliency of the packing and the pressure of the liquid or gas conveyed through the coupling cooperates to maintain the coupling members against relative displacement and to provide an absolutely tight joint.

In the drawings, 2 designates a tubular coupling member, its inner end being externally threaded to receive a sleeve 3 or union member which is provided near its middle point with an internal rib 4 forming an annular shoulder.

A relatively pliable and preferably resilient rubber gasket 5 seats against said shoulder of the sleeve 3 and is clamped in position by the inner end of the coupling member 2, a metal washer 6 being positioned between said member and the gasket to prevent the member 2 chewing into said gasket during the tightening of the sleeve. The gasket 5 is preferably in the form of a disc disposed in a plane extending transversely to the coupling, and it normally assumes the position as shown in Fig. 2 and is provided with a central port of a diameter which is less than that of the bore of the coupling. A second tubular coupling member 7 is adapted to freely engage into the open end of the sleeve 3 and the extreme inner end of said member is formed to provide an annular seat 8 which, when the coupling members are united, extends beyond the rib 4 of the sleeve and contacts with the surface of the rubber gasket 5 on the side remote from the fluid supply and forcibly flexes or bulges it to approximately the position shown in Fig. 3, and toward the fluid supply.

To maintain the coupling members in engaging position, the sleeve 3 is provided with opposed bayonet slots 9 which cooperate with opposed pins 10 projecting radially from the coupling member 7. (See Figs. 1, 2 and 4). It will be noted that the bayonet slots 9 are formed to provide notches 11 and that the pins 10 engaging these notches will prevent rotary displacement of the coupling member 7 relative to the sleeve 3, and as the inherent resiliency of the gasket 5, flexed as in Fig. 3, will exert a longitudinal tension to separate the coupling members, it will be evident that the pins 10 will be yieldingly maintained in locking engagement with the notches 11 of the bayonet slots 9 and that the gasket will form a tight joint against the seat 8 of the member 7.

To enable the velocity of the conveyed liquid or gas to cooperate in the forming of a tight joint, the inner end of the bore of the coupling member 2 is enlarged so that the liquid or gas may engage the surface of the gasket 5 facing the source of supply, the liquid or gas flexing the inner peripheral portion of said gasket in the direction of flow and around the seat 8 to the position indicated in dotted lines in Fig. 3.

It will therefore be evident that the resiliency of the gasket yieldingly maintains the members in locked engagement and forms an absolutely tight joint between the two members, and that the velocity of the conveyed liquid or gas acts to render these functions more positive, and also that the greater the velocity of the liquid or gas the more positive these functions will be performed.

While the coupling members are illustrated in Figs. 1 to 3, as having serrated ends for connection with hose lengths, and in Fig. 5, as internally threaded for connection with pipe lengths, or valves or faucets, it will be evident that these forms are optional as various other types of connections may be provided to meet the requirements of various uses.

I claim:

A coupling comprising a tubular coupling member having a sleeve removably secured thereto, said sleeve having an inwardly extending annular rib, a pliable gasket within the sleeve in the form of a disc held at its edge and having a port therethrough, the gasket being positively held between the rib and the end of the tubular coupling, a second tubular coupling member mounted to slide into the open end of the sleeve and having a face on its extreme end operating as an annular seat for engaging the side of the gasket, and operating to bulge the middle portion of the gasket out of its normal plane, said port being of smaller diameter than the bore of said second named tubular coupling member so that the material of said gasket projects inwardly at the edge of the port and presents an overhanging portion projecting within the circumference of the bore of the said second named tubular coupling member, said second named tubular coupling member being disposed on the side of the coupling toward which the fluid flows in passing through the coupling and the said second tubular member presenting an end face which projects past the normal plane of the gasket and bulges the middle portion of the gasket out of its normal plane whereby the pressure of the fluid on the said overhanging inner portion of the gasket presses the gasket against said annular seat.

Signed at Los Angeles, California, this 26th day of February, 1921.

JAMES A. HOMAND.